(12) United States Patent
Nagao (10) Patent No.: US 7,662,061 B2
(45) Date of Patent: Feb. 16, 2010

(54) TRANSMISSION

(76) Inventor: Takafumi Nagao, 313 Naka, Wakayama-shi, Wakayama 640-8451 (JP)

(*) Notice: Subject to any disclaimer, the term of this patent is extended or adjusted under 35 U.S.C. 154(b) by 213 days.

(21) Appl. No.: 11/649,073

(22) Filed: Jan. 4, 2007

(65) Prior Publication Data

US 2007/0117674 A1 May 24, 2007

Related U.S. Application Data

(60) Provisional application No. 60/757,496, filed on Jan. 10, 2006.

(51) Int. Cl.
 *F16H 3/62* (2006.01)
(52) U.S. Cl. ........................ 475/290; 475/342
(58) Field of Classification Search .............. 475/290, 475/296, 342
 See application file for complete search history.

(56) References Cited

U.S. PATENT DOCUMENTS

| 4,621,541 A | * | 11/1986 | Takahashi | 475/146 |
|---|---|---|---|---|
| 5,322,488 A | | 6/1994 | Ra et al. | |
| 5,326,334 A | | 7/1994 | Ra et al. | |
| 5,330,395 A | | 7/1994 | Ra et al. | |
| 5,643,130 A | | 7/1997 | Park | |
| 5,865,703 A | * | 2/1999 | Shiokawa et al. | 475/269 |
| 5,993,347 A | | 11/1999 | Park | |
| 6,270,441 B1 | | 8/2001 | Park | |
| 6,302,821 B1 | | 10/2001 | Lee | |
| 6,705,967 B2 | | 3/2004 | Raghavan et al. | |
| 6,991,578 B2 | | 1/2006 | Ziemer | |

FOREIGN PATENT DOCUMENTS

| JP | 52-92065 A | | 8/1977 |
|---|---|---|---|
| JP | 62-92242 U | | 6/1987 |
| JP | 2001-153191 A | | 6/2001 |
| JP | 2003-227551 A | | 8/2003 |
| JP | 2004-360777 A | | 12/2004 |
| JP | 2005-16704 A | | 1/2005 |
| JP | 2005016732 A | * | 1/2005 |

OTHER PUBLICATIONS

The p. 152 of "Mechanism Book of Automobile" (Tadaaki Idei), published Nov. 22, 1989 by Grand Prix Publishing Corporation in Japan; Together with an English-language translation of the underlined sentence thereof.
Japanese Office Action dated Mar. 10, 2009 (with English translation).

* cited by examiner

*Primary Examiner*—Sherry L Estremsky
*Assistant Examiner*—Erin D Bishop (57) ABSTRACT

The transmission comprises a sun gear fixed to an input shaft, four pinions, and a carrier part connected to an output shaft. Each pinion has a planetary gear engaged with the sun gear, and planetary gears having the number of teeth different from that of that planetary gear. Each internal gear engaged with these planetary gears can perform a independent rotating motion by the rotation of the input shaft. The braking force is selectively applied to the rotating motion of each internal gear by pressing breaking part by the actuator in selecting a gear for gearshift. Here, the braking force is gradually increased to stop the rotating motion. As a result, the power interrupter becomes unnecessary and the miniaturization of the transmission can be attained.

5 Claims, 9 Drawing Sheets

TRANSMISSION

RELATED APPLICATION DATA

This application claims priority to provisional application No. 60/757496 filed on Jan. 10, 2006.

BACKGROUND OF THE INVENTION

1. Field of the Invention

This invention relates to a technique of a transmission capable of performing a gearchange between input/output shafts.

2. Description of the Background Art

As a transmission connected to a prime mover, if an automobile is mentioned as an example, a manual transmission and an automatic transmission are known.

In the manual transmission, a gearshift is performed by changing tabling of gears while a clutch is cutting power.

In the automatic transmission, a gearshift is performed by controlling a gearbox which have planetary gears and a torque converter.

However, in the above-mentioned manual transmission, since the clutch (power interrupter) which performs cutting and transfer of power in the case of gearshift is necessary, the cost increases and an installation space is also needed.

Moreover, since the automatic transmission has the gear type transmission and the torque converter, an equipment configuration is complicated and there is a limitation in a miniaturization.

SUMMARY OF THE INVENTION

The present invention is directed to a transmission capable of performing a gearchange between a first shaft and a second shaft which are input/output shafts.

According to the present invention, the transmission comprises: (a) a sun gear operatively connected to the first shaft; (b) a planetary gear group including two or more multi-stage planetary gears equipped with a plurality of gears each of which has the different number of teeth, each multi-stage planetary gear including a gear of a specific stage which meshes with the sun gear; (c) a carrier operatively connected to the second shaft and rotatably holding the each multi-stage planetary gear; (d) an internal gear group including internal gears which mesh each of the plurality of gears in each multi-stage planetary gear, each internal gear being able to perform an independent rotating motion by rotation of an input shaft; and (e) a braking selector which makes braking force act selectively on a rotating motion of each internal gear, the braking selector including a braking force changer which changes a free state, a restriction state and a stop state with regard to rotation of each internal gear by changing the braking force. Consequently, a power interrupter is unnecessary at the time of the gearshift and the miniaturization of the transmission can be attained.

According to a preferred embodiment of the present invention, in the transmission, the braking force changer changes the braking force by changing a thrust of a member pressed on a internal gear. Therefore, the braking force can be changed easily.

It is therefore an object of the present invention to provide a technique of a transmission to make a power interrupter unnecessary and to attain miniaturization.

These and other objects, features, aspects and advantages of the present invention will become more apparent from the following detailed description of the present invention when taken in conjunction with the accompanying drawings.

DESCRIPTION OF THE PREFERRED EMBODIMNTS

First Preferred Embodiment

Construction of Transmission

Figure 1:
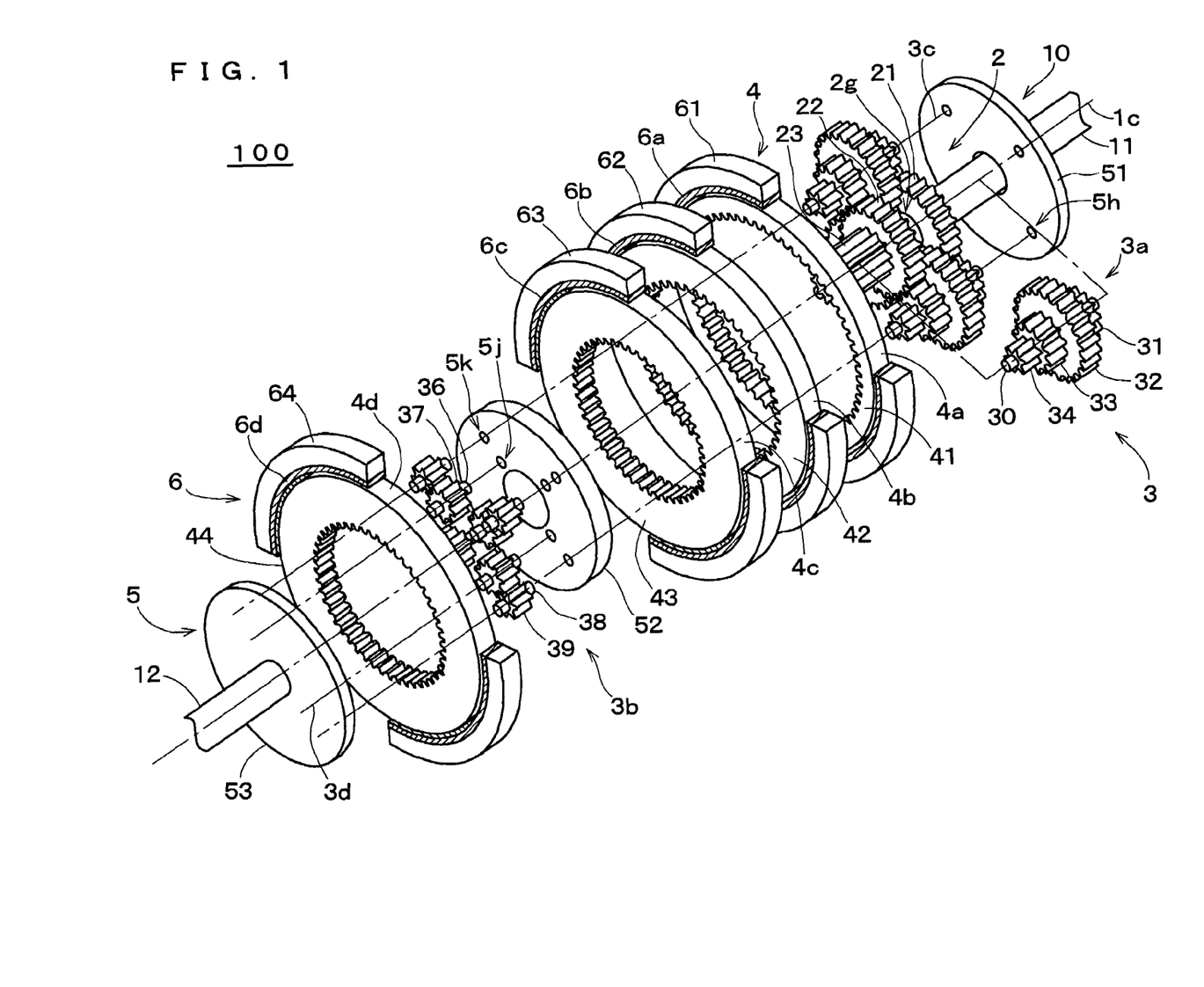
FIG. 1 is an exploded view showing the main parts of the transmission concerning the first preferred embodiment of this invention.
Figure 2:
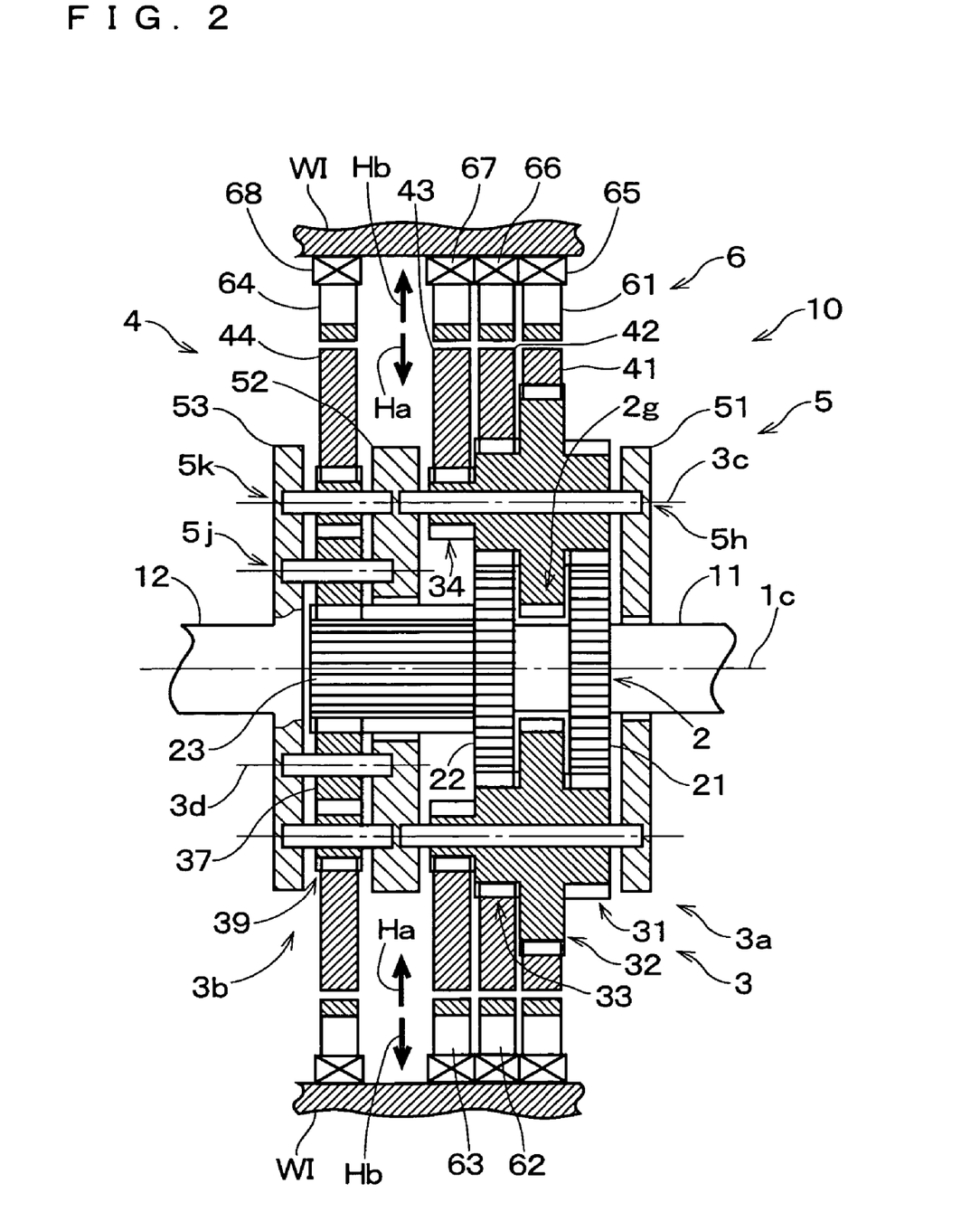
FIG. 2 is a sectional view showing the configuration of the transmission of FIG. 1.

FIG. 1 is an exploded view showing the main parts of the transmission 100 concerning the first preferred embodiment of this invention. Moreover, FIG. 2 is a sectional view showing the configuration of the transmission 100. In addition, illustration of actuators 65 to 68 is omitted in FIG. 1.

The transmission 100 is equipped with the gearshift mechanism part 10 of a gear type, and the gear selection part 6 for performing a gearchange in the gearshift mechanism part 10, and is constituted as a four-stage transmission.

The gearshift mechanism part 10 is equipped with the input shaft (the 1st shaft) 11, the sun gear part 2 fixed to the end of the input shaft 11, the planetary gear part 3 which gears with the sun gear part 2, and the internal gear part 4 which gears with the planetary gear part 3. Moreover, the gearshift mechanism part 10 is equipped with the carrier part 5 rotatably holding the planetary gear part 3, and the output shaft (the 2nd shaft) 12 operatively connected to the carrier part 5.

The input shaft 11 can rotate with a focus on the main shaft 1c of the transmission 100, and is connected to for example, an engine (prime mover) of an automobile.

The sun gear part 2 has three sun gears 21 to 23 operatively connected to the input shaft 11. In addition, the groove 2g is formed between the sun gear 21 and the sun gear 22, which has a little bigger width than the face width of the below-mentioned planetary gear 32, and has the depth that does not contact the addendum of the planetary gear 32.

Although the sun gear 21 and sun gear 22 have the same number of teeth, the sun gear 23 has the number of teeth less than that of these.

The planetary gear part (planetary gear group) 3 consists of four pinions 3a and four double pinion 3b.

Each shaft center 3c of four pinions 3a is arranged equiangularly in every 90 degrees in the concentric circle centering on the main shaft 1c. And each pinion 3a can be freely rotated to the shaft 30, and has the multistage planetary gears 31 to 34 formed in one. As for these planetary gears 31 to 34, the face width is respectively equal.

The planetary gears 31 and 33 have the same number of teeth, and mesh with the sun gears 21 and 22.

The planetary gear 32 has the number of teeth more than that of the planetary gears 31 and 33. For this reason, if the root circle of the planetary gear 32 and the root circle of the sun gears 21 and 22 are projected in the direction of the main shaft 1c, both root circles cross. Then, it is made for the addendum of the planetary gear 32 to enter the groove 2g of the sun gear part 2, and it secures free rotation of the planetary gear 32.

The planetary gear 34 has the number of teeth less than that of planetary gears 31 and 33. For this reason, the planetary gear 34 does not mesh with the sun gear 22.

As mentioned above, the pinion 3a has three-stage planetary gear equipped with three planetary gears 32 to 34 each of which has the different number of teeth. In this multi-stage planetary gear, the planetary gear 33 of a specific stage meshes with the sun gear 22. And the pinion 3a has composition further equipped with the gear which has the same number of teeth as the planetary gear 33 of the above-mentioned specific stage, and meshes only with the sun gear 21.

Four double pinions 3b are equipped with the first planetary gear 37 which can be rotated freely to the shaft 36 and the second planetary gear 39 which can be rotated freely to the shaft 38. And each shaft center 3d and each shaft center 3c of four double pinion 3b are arranged with equiangular in every 90 degrees to the main shaft 1c.

The first planetary gear 37 meshes with the sun gear 23, and meshes with the second planetary gear 39.

The number of teeth of the second planetary gear 39 is less than that of the first planetary gear 37. This is for making moment of inertia around the main shaft 1c small by making the number of teeth of the second planetary gear 39 far from the main shaft 1c fewer than that of the first planetary gear 37.

The internal gear part (internal gear group) 4 has four internal gears (ring gear) 41 to 44 with an annular shape each of which can perform an independent rotating motion centering on the main shaft 1c around the planetary gear part 3. And each peripheral face 4a to 4d of the internal gears 41 to 44 has the cylinder-like curved surface, and has the same diameter.

The internal gear 41 meshes with the planetary gear 32, and the internal gear 42 meshes with the planetary gear 33. Moreover, the internal gear 43 meshes with the planetary gear 34, and the internal gear 44 meshes with the second planetary gear 39.

Thus, the internal gears 41 to 43 which mesh with each planetary gear 32 to 34 that has the different number of teeth have the different number of teeth. That is, the internal gear 42 has the number of teeth less than that of the internal gear 41, and more than that of the internal gear 43.

The planetary gear 31 is not engaged with the internal gears 41 to 44 but meshes only with the sun gear 21. This is for arranging the planetary gears 31 and 33 which mesh with the sun gears 21 and 22 on both adjacent sides of the planetary gear 32 which does not mesh with the sun gears 21 and 22. That is, since the force can be transmitted with sufficient balance to the sun gears 21 and 22 through the planetary gears 31 and 33 on both adjacent sides of the planetary gear 32 even when the rotation of the internal gear 41 which meshes with the planetary gear 32 is prevented like the after-mentioned, the burden of shaft 30 etc. can be mitigated.

In addition, the planetary gear 34 as well as the planetary gear 32 does not mesh with sun gears 21 and 22. In this case, since the planetary gear 33 which meshes with the sun gear 22, and the double pinion 3b which gears with the sun gear 23 are next to the planetary gear 34, the force can be transmitted to the sun gear through both these gears even when the rotation of the internal gear 43 which meshes with the planetary gear 34 is stopped. Even in such a case, it is desirable to add a planetary gear next to the planetary gear 34, which meshes only with the sun gear and has the same number of teeth as the planetary gear 33.

The carrier part 5 is equipped with three carriers 51 to 53. Since each carrier 51 to 53 is connected by the shaft 30 of the pinion 3a and each shaft 36 and 38 of the double pinion 3b, an integrated rotating motion of them with a focus on the main shaft 1c is possible.

The carrier 51 has the configuration of an annular shape which has a circular hole in a center section. The diameter of the circular hole is larger than the diameter of the input shaft 11, and the carrier 51 can rotate with a focus on the main shaft 1c. Moreover, four holes 5h which fix the tip of each shaft 30 of the pinions 3a are formed at one principal plane of the carrier 51.

The carrier 52 has the configuration of an annular shape which has a circular hole in a center section. The diameter of the circular hole is larger than the diameter of the addendum circle of the sun gear 23, and the carrier 52 can rotate with a focus on the main shaft 1c. Moreover, four holes 5h which fix the tip of each shaft 30 of the pinions 3a are formed at one principal plane of the carrier 52, and four holes 5j and 5k which fix the tip of each shaft 36 and 38 of the double pinions 3b are formed at another principal plane of the carrier 52.

The carrier 53 has the disc-like configuration and can rotate with a focus on the main shaft 1c. Moreover, the output shaft 12 connects to the center section of one principal plane of the carrier 53, and four holes 5j and 5k which fix the tip of each shaft 36 and 38 of the double pinions 3b are formed at another principal plane of the carrier 53.

The gear selection part 6 is equipped with four braking parts 61 to 64 and four actuators 65 to 68 for making each braking parts 61 to 64 press the peripheral faces 4a to 4d of the internal gear. The gear selection part 6 functions as a braking selector which makes braking force act selectively to rotating motion of each internal gear 41 to 44.

Each braking part 61 to 64 is constituted as a braking member like for example, a drum brake. That is, each braking part 61 to 64 has a structure to fix linings 6a to 6d on the internal surfaces of two arc-shaped shoes which are opposite through the internal gear and have almost same curvature as the peripheral face 4a to 4d of the internal gear 41 to 44. Since friction arises when each lining 6a to 6d contacts the peripheral face 4a to 4d of the internal gear, the braking force to rotating motion of the internal gear occurs, and it becomes possible to stop rotation of the internal gear.

Each actuator 65 to 68 is constituted as for example, a hydraulic actuator fixed to the internal surface WI of the casing of the transmission 100, and can move the braking parts 61 to 64 in the radial directions Ha and Hb of the internal gear. By driving these actuators 65 to 68, after moving each braking part 61 to 64 in the radial direction Ha and stopping rotation of the internal gear, it becomes possible to move the braking part in the radial direction Hb and to rotate the internal gear again.

Each actuator 65 to 68 can control the thrust of each braking part 61 to 64 pressed on the peripheral faces 4a to 4d of the internal gear by performing oil pressure regulation by for example, PCV (pressure control valve). Thus, since the thrust of the braking parts 61 to 64 in contact with the internal gear can be changed by the actuators 65 to 68, it becomes possible to change braking force from "0" to the braking force which stops rotation of the internal gear through the braking force with which rotation of the internal gear is restricted. Consequently, governing of the internal gear can be performed and it is possible to change a free state (state of non-braking), a restriction state and a stop state with regard to rotation of the internal gear.

Gearshift of the Transmission 100

Figure 3:
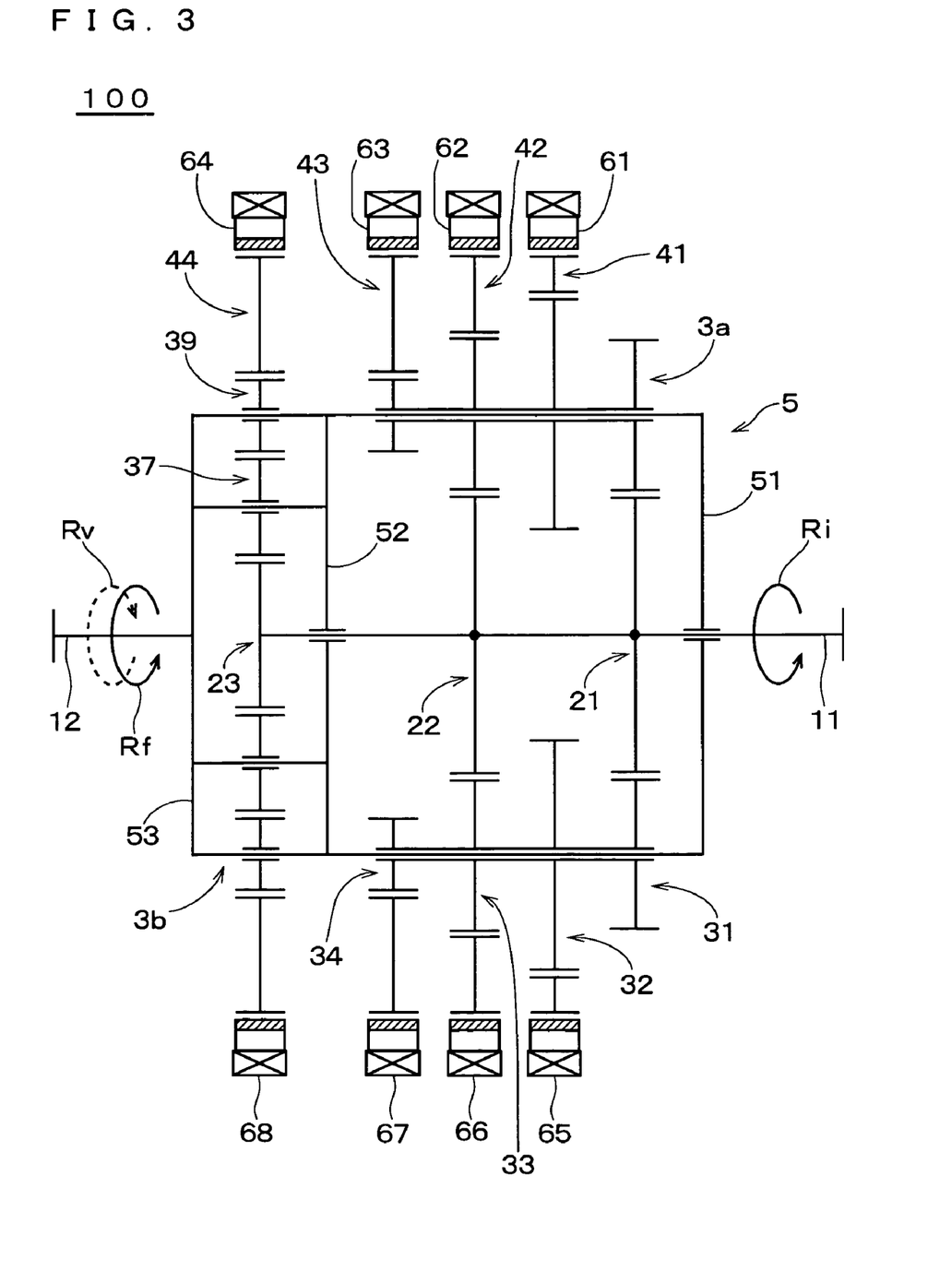
FIG. 3 is a view showing a frame format for explaining the principle of gearshift of the transmission of FIG. 1.

FIG. 3 corresponds to FIG. 2, and is a view showing a frame format (skeleton) for explaining the principle of gearshift of the transmission 100.

It is possible for the transmission 100 to choose a gear step from three forward gear steps which consist of the first gear step, the second gear step and the third gear step in descending order of the change gear ratio, and to choose one reverse gear step (reverse) reversing the rotation direction of the output shaft 12 to the input shaft 11. Below, the operation to select each gear step in the condition that neither of the gear steps is chosen, i.e., the condition that each internal gear 41 to 44 is independently rotating with rotation of the input shaft 11 is explained. In addition, it is made not to choose two or more gear steps simultaneously in the transmission 100, so that the gearshift mechanism part 10 is destroyed.

(1) Selection of the First Gear Step

When the actuator 67 is driven and rotation of the internal gear 43 is only stopped while the input shaft 11 rotates to the rotation direction Ri, orbital motion of the pinion 3*a* centering on the main shaft 1*c* is performed at the orbital speed specified by the engagement between the internal gear 43 and the planetary gear 34, and the engagement between the planetary gear 33 and the sun gear 22. By the orbital motion of this pinion 3*a*, the carrier part 5 which supports the pinion 3*a* to revolve with a focus on the main shaft 1*c* and the output shaft 12 connected to the carrier part 5 also rotates with the change gear ratio of the first gear step to the same rotation direction Rf as the input shaft 11.

(2) Selection of the Second Gear Step

When the actuator 66 is driven and rotation of the internal gear 42 is only stopped while the input shaft 11 rotates to the rotation direction Ri, orbital motion of the pinion 3*a* centering on the main shaft 1*c* is performed at the orbital speed specified by the engagement between the internal gear 42 and the planetary gear 33, and the engagement between the planetary gear 33 and the sun gear 22. By the orbital motion of this pinion 3*a*, the carrier part 5 which supports the pinion 3*a* to revolve with a focus on the main shaft 1*c*, and the output shaft 12 connected to the carrier part 5 also rotates with the change gear ratio of the second gear step to the same rotation direction Rf as the input shaft 11.

(3) Selection of the Third Gear Step

When the actuator 65 is driven and rotation of the internal gear 41 is only stopped while the input shaft 11 rotates to the rotation direction Ri, orbital motion of the pinion 3*a* centering on the main shaft 1*c* is performed at the orbital speed specified by the engagement between the internal gear 41 and the planetary gear 32, and the engagement between the planetary gear 33 and the sun gear 22. By the orbital motion of this pinion 3*a*, the carrier part 5 which supports the pinion 3*a* to revolve with a focus on the main shaft 1*c* and the output shaft 12 connected to the carrier part 5 also rotates with the change gear ratio of the third gear step to the same rotation direction Rf as the input shaft 11. As for this third gear step, since the number of teeth of the planetary gear 32 is more than that of the planetary gear 33 which meshes with the sun gear 22, it is also possible to realize two or less change gear ratio.

(4) Selection of the Reverse Gear Step

When the actuator 68 is driven and rotation of the internal gear 44 is only stopped while the input shaft 11 rotates to the rotation direction Ri, orbital motion of the double pinion 3*b* centering on the main shaft 1*c* is performed at the orbital speed specified by the engagement between the internal gear 44 and the double pinion 3*b*, and the engagement between the double pinion 3*b* and the sun gear 23. By the orbital motion of this double pinion 3*b*, the carrier part 5 which supports the double pinion 3*b* to revolve with a focus on the main shaft 1*c* and the output shaft 12 connected to the carrier part 5 is also rotates. In this case, the rotation direction Rv of the output shaft 12 is an opposite direction of the rotation direction Ri of the input shaft 11.

Although each gear step can be choose in the transmission 100 as mentioned above, the rotation region (the range of revolution speed) is restrict when the input shaft 11 is connected to an engine etc. of an automobile. Thus by only driving the actuators 65 to 68 and suddenly stopping rotation of each internal gear 41 to 44, there is a case where the engine is loaded to stop, and possibility that an intense gear change (shift) shock may arise.

Then, the gearshift operation in consideration of the case where the transmission 100 is equipped in an automobile is explained with reference to FIG. 4.

Figure 4:
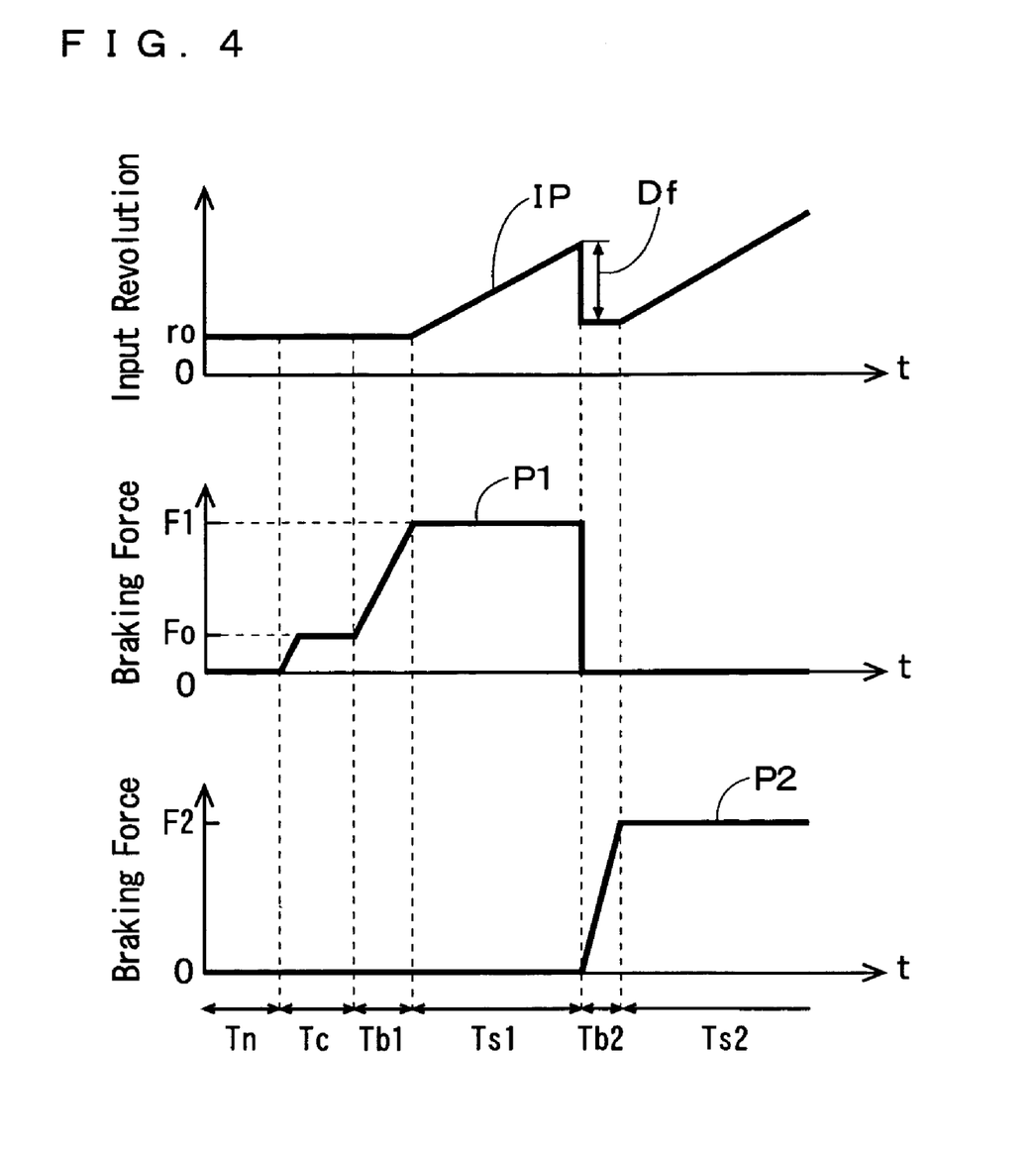
FIG. 4 is a conceptual diagram for explaining automatic gearshift operation in a case where the transmission of FIG. 1 is equipped in an automobile.

FIG. 4 is a conceptual diagram for explaining automatic gearshift operation in a case where the transmission 100 is equipped in an automobile. Here, graph IP shows time change of the revolution speed (input revolution) of the input shaft 11. Moreover, graph P1 shows time change of the braking force made to act on the internal gear 43 of the first gear step, and the graph P2 shows time change of the braking force made to act on the internal gear 42 of the second gear step.

Below, a case where after starting the engine and selecting a drive range (D range) by the select lever, a shift up to the second gear step is carried out by treading of the accelerator to raise throttle-valve gate opening explains as an example. In addition, the load of the output shaft 12 is fixed for convenience.

First, in the time zone Tn after starting the engine, as shown in graph IP, the input shaft 11 rotates at the revolution (revolution speed) ro which is comparatively low-speed. In this case, all the internal gears 41 to 44 rotate by rotation of the input shaft 11.

When D range is selected, by driving the actuator 67, the braking part 63 is made to press gradually and slide on the peripheral face 4*c* of the internal gear 43 of the first gear step, and to act on the braking force Fo (refer to graph P1) such that the revolution speed of the internal gear 43 falls a little.

By this, since rotation of the internal gear 43 does not stop completely but a certain rotation is maintained, the output shaft 12 rotates at the speed lower than the speed of the time of the rotation stoppage of the internal gear 43. That is, in the time zone Tc after D range selection, since the operation to change from a free state to a restriction state with respect to rotation of the internal gear 43, and to maintain the restriction state is performed, there becomes a condition similar to a half-clutch condition of a manual clutch car, and a creep for an automobile to move forward gradually with a reduction gear ratio larger than the change gear ratio of the first gear step can be realized.

Next, by treading of the accelerator, the operation to select the first gear step and to accelerate is performed in the time zone Tb1 and the time zone Ts1, and the operation to carry out a shift up from the first gear step to the second gear step, and to accelerate is performed in a time zone Tb2 and a time zone Ts2. The operation in these time zones is explained in detail below.

In the time zone Tb1, the braking force made to act on rotation of the internal gear 43 of the first gear step is made to increase gradually as shown in the graph P1 from the braking force Fo with which the internal gear 43 slips to the braking force F1 with which rotation of the internal gear 43 stops completely. When the braking force F1 is reached, the rotation of the internal gear 43 stops and becomes stationary. Thereby, gearshift to the first gear step is completed, and the output shaft 12 rotates at the revolution speed according to the change gear ratio of the first gear step.

In the time zone Ts1, as shown in the graph IP, the revolution speed of the input shaft 11 rises according to the amount of treading of the accelerator, and accordingly the revolution speed of the output shaft 12 also rises. Also in this case, as shown in the graph P1, the braking force F1 is made to act by the braking part 63, and the rotation stop state of the internal gear 43 is maintained. In addition, although the rotation stop state of the internal gear 43 can be maintained with the constant braking force F1 as shown in the graph P1 when the load of the output shaft 12 is constant and does not change, the braking force required for the rotation stop of the internal gear 43 also increases when the load of the output shaft 12 increases.

In the time zone Tb2, first, the state of the internal gear 43 of the first gear step restrained by the braking part 63 is released. Specifically, by driving the actuator 67, the braking part 63 is pulled away from the peripheral face 4c of the internal gear 43, and the braking force is set to "0" as shown in the graph P1.

As shown in the graph IP, the revolution speed of the input shaft 11 is decreased. Here, as for the decreasing rate Df of the revolution speed, it is desirable to control the revolution speed of the input shaft 11 so that it becomes the decreasing rate computed based on the following expression(1).

(Decreasing rate)=1−(change gear ratio of the second gear step)/(change gear ratio of the first gear step)    (1):

Next, the braking force made to act on rotation of the internal gear 42 of the second gear step is made to increase as shown in the graph P2 from the braking force "0" with which the internal gear 42 can rotate freely to the braking force F2 with which rotation of the internal gear 42 stops completely. In this case, since the closer the decreasing rate Df of the revolution speed of the input shaft 11 is to the decreasing rate computed by the above-mentioned expression(1), the smaller the gearshift shock becomes, the increasing rate of the braking force can be enlarged and compaction of the gearshift time Tb2 can be attained. And when the braking force F2 is reached, the rotation of the internal gear 42 stops. Thereby, the gearshift to the second gear step is completed, and the output shaft 12 rotates at the revolution speed according to the change gear ratio of the second gear step.

In the time zone Ts2, the revolution speed of the input shaft 11 rises according to the amount of treading of the accelerator as shown in the graph IP, and accordingly the revolution speed of the output shaft 12 also rises. Also in this case, the braking force F2 is made to act by the braking part 62 as shown in the graph P2, and the rotation stop state of the internal gear 42 is maintained.

As mentioned above, in the time zones Tb2 and Ts2, since the change from the free state to the stop state through the restriction state about rotation motion of the internal gear 42 and the operation to maintain the stop state are performed, gearshift can be carried out appropriately without using a power interrupter.

In addition, the shift up from the second gear step to the third gear step is the same operation as the shift up from the first gear step to the second gear step in the time zone Tb2 mentioned above.

Moreover, when a reverse step is selected, the same creeping operation as the time zone Tc mentioned above is carried out first and then by treading of the accelerator, the same operation as the time zones Tb1 and Ts1 mentioned above is performed.

By the above configuration and operation of the transmission 100, since the gearshift is carried out by making braking force act gradually to rotation of the internal gear of the selected gear step, a power interrupter becomes unnecessary and the miniaturization of the transmission can be attained. Moreover, since the transmission 100 is a gear-type transmission, the efficiency of power transfer is good.

Second Preferred Embodiment

Construction of Transmission

Figure 5:
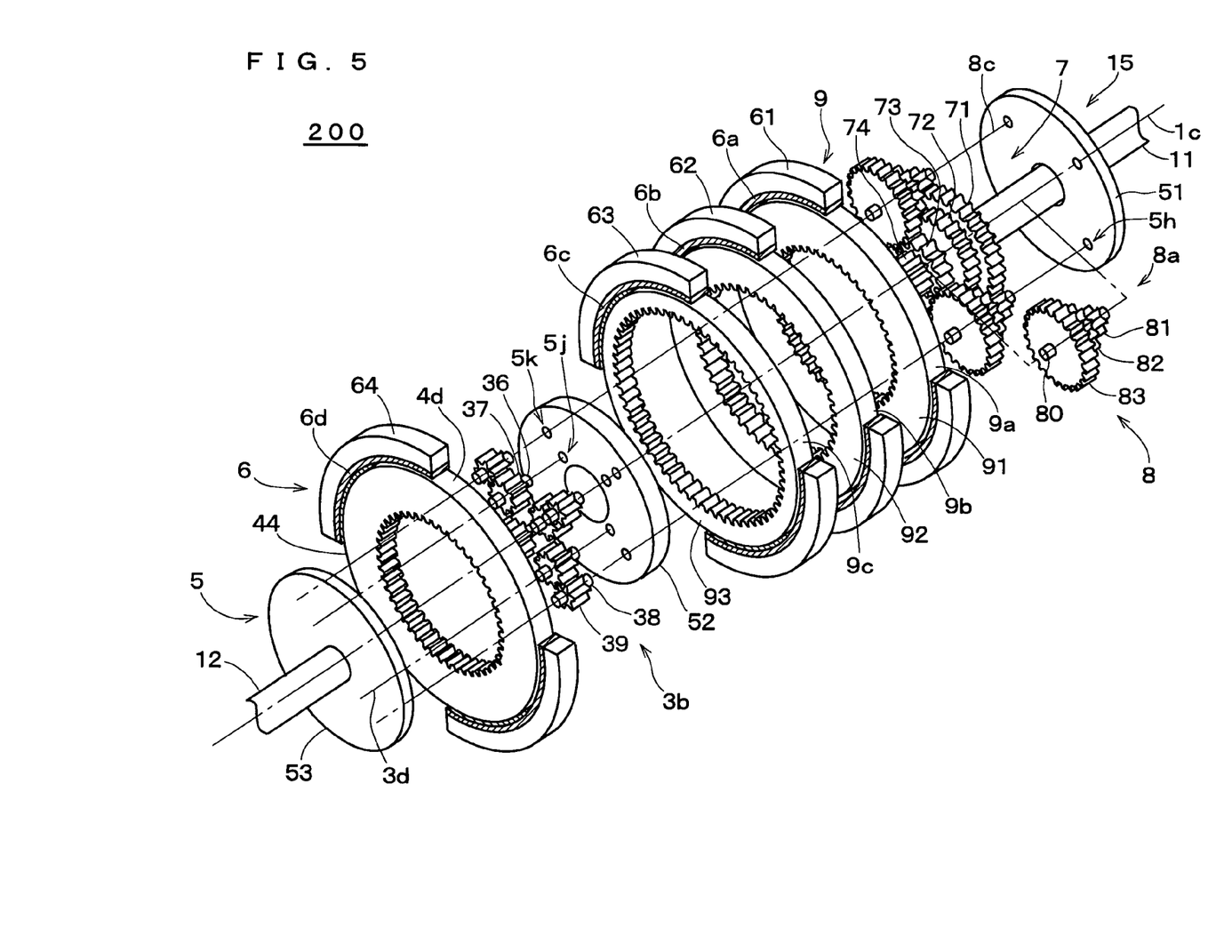
FIG. 5 is an exploded view showing the main parts of the transmission concerning the second preferred embodiment of this invention.
Figure 6:
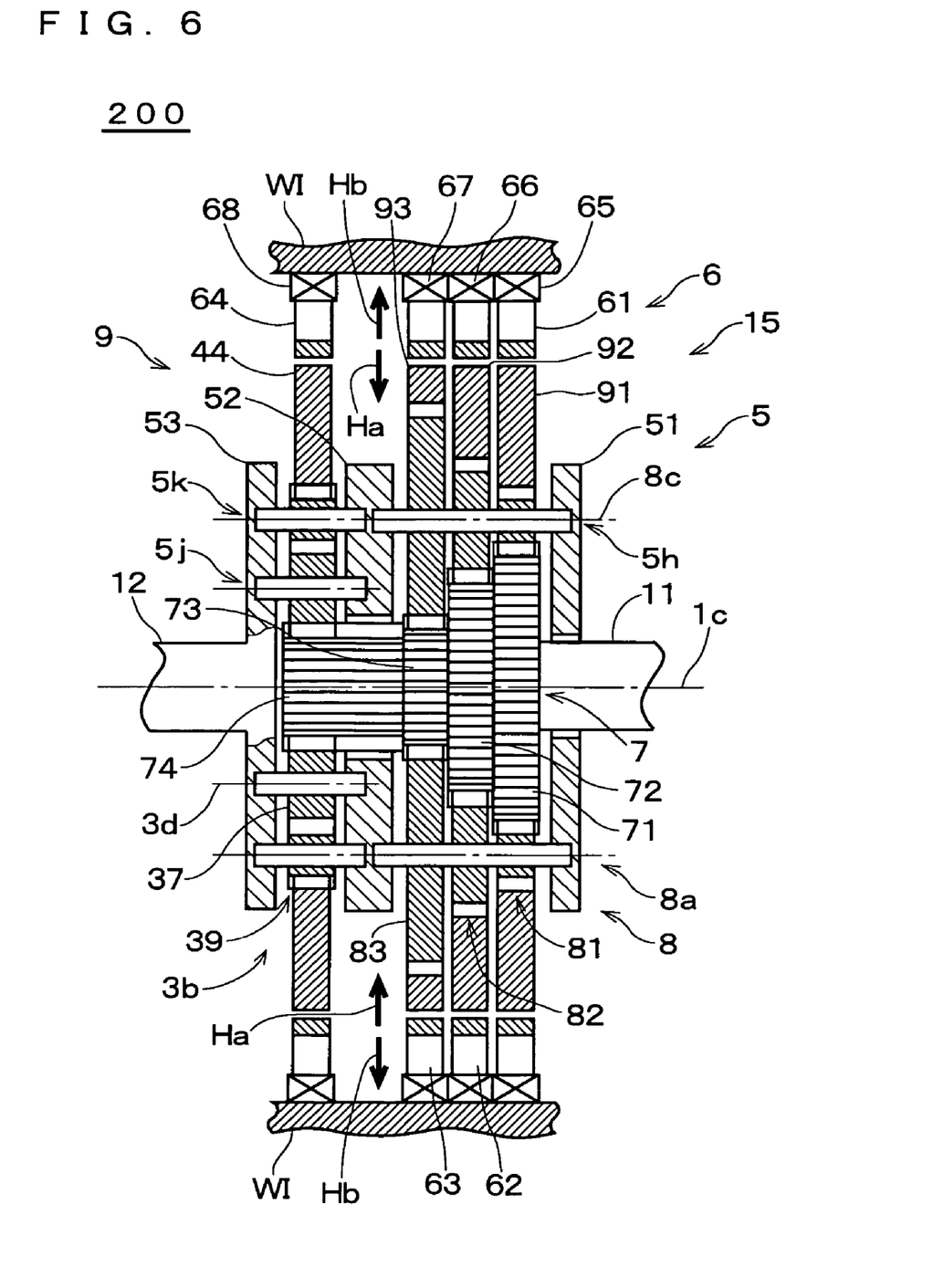
FIG. 6 is a sectional view showing the configuration of the transmission of FIG. 5.

FIG. 5 is an exploded view showing the main parts of the transmission 200 concerning the second preferred embodiment of this invention. Moreover, FIG. 6 is a sectional view showing the configuration of the transmission 200. In addition, illustration of actuators 65 to 68 is omitted in FIG. 5.

The transmission 200 of the second preferred embodiment has the configuration similar to the transmission 100 of the first preferred embodiment, but the configurations of the sun gear part, the planetary gear part and the internal gear part in the gearshift mechanism part are different. Therefore, with the second preferred embodiment, different points from the first preferred embodiment are explained. The same reference symbol as the first preferred embodiment is given to the same configuration, and duplication explanation is omitted.

The sun gear part 7 in the gearshift mechanism part 15 of the transmission 200 has four-stage sun gears 71 to 74 operatively connected to the end of the input shaft 11. These four sun gears 71 to 74 are formed in one, and respectively have the different number of teeth. Specifically, there are the sun gear 71, the sun gear 72, the sun gear 73 and the sun gear 74 in descending order of the number of teeth. In addition, the number of teeth of the sun gear 74 is equal to the number of teeth of the sun gear 23 of the first preferred embodiment.

The planetary gear part (planetary gear group) 8 of the transmission 200 consists of four pinion groups 8a and the same four double pinion 3b as the first preferred embodiment.

Each shaft center 3c of four pinion groups 8a is arranged equiangularly in every 90 degrees in the concentric circle centering on the main shaft 1c. And each pinion group 8a has three planetary gears 81 to 83 each of which can independently rotates to the shaft 80 held by the carrier part 5. As for these planetary gears 81 to 83, the face width is respectively equal.

The planetary gear 81 meshes with the sun gear 71. The planetary gear 82 which has the number of teeth more than that of this planetary gear 81 meshes with the sun gear 72. Moreover, the planetary gear 83 has the number of teeth more than that of the planetary gear 82, and meshes with the sun gear 73.

As mentioned above, each planetary gear 81 to 83 of the pinion group 8a meshes each of the three sun gears 71 to 73 in the multi-stage sun gear.

The internal gear part (internal gear group) 9 of the transmission 200 has three internal gears 91 to 93 with an annular shape each of which can perform an independent rotating motion centering on the main shaft 1c, and the same internal gear 44 as the first preferred embodiment. Each peripheral face 9a to 9c and 4d of the internal gear 91 to 93 has the cylinder-like curved surface, and has the same diameter.

The internal gear 91 meshes with the planetary gear 81, and the internal gear 92 meshes with the planetary gear 82. Moreover, the internal gear 93 meshes with the planetary gear 83.

Thus, the internal gears 91 to 93 which mesh with each planetary gear 81 to 83 that has the different number of teeth have the different number of teeth. That is, the internal gear 92 has the number of teeth more than that of the internal gear 91 and less than that of the internal gear 93.

Gearshift of the Transmission 200

Figure 7:
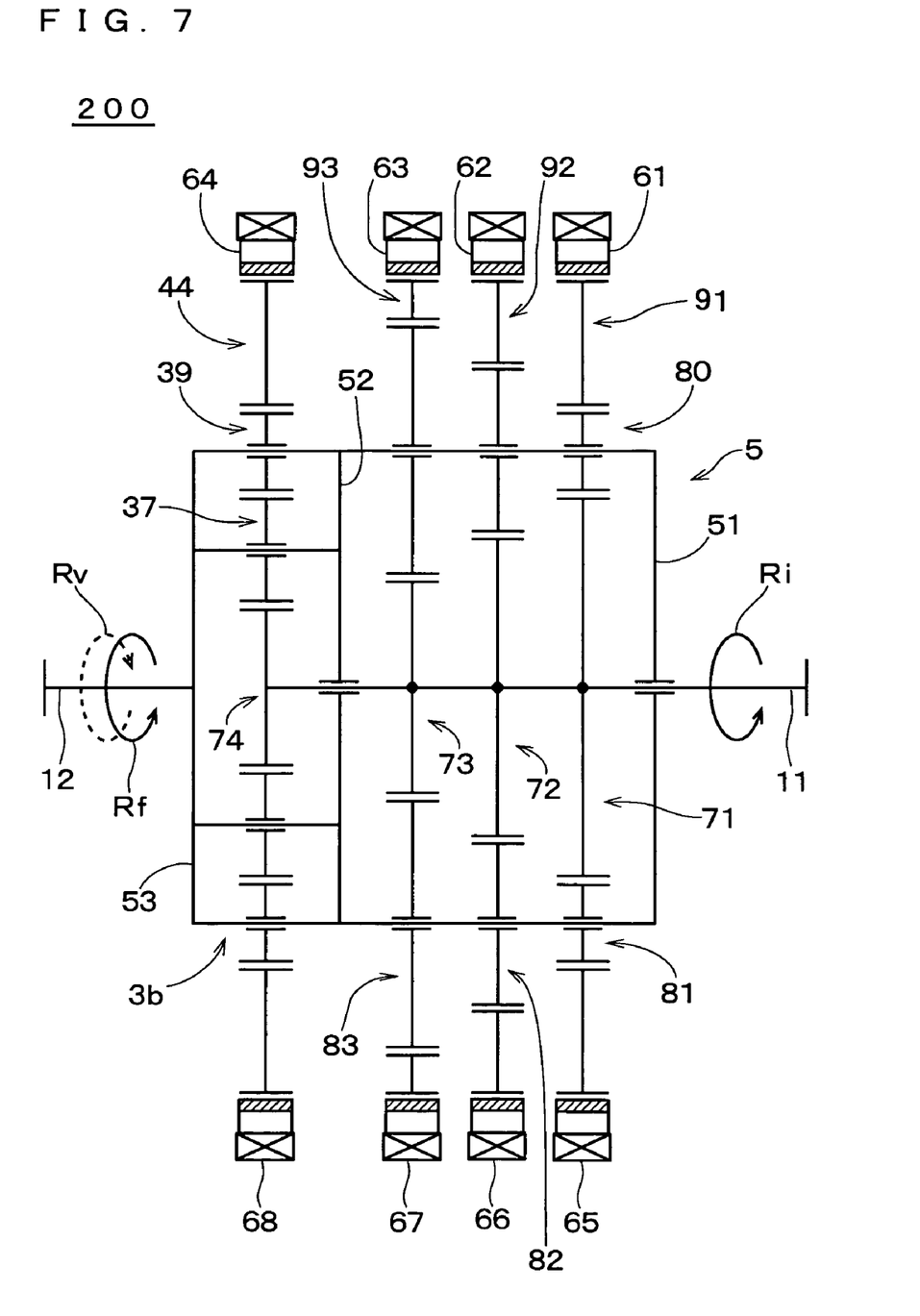
FIG. 7 is a view showing a frame format for explaining the principle of gearshift of the transmission of FIG. 5.

FIG. 7 corresponds to FIG. 6, and is a view showing a frame format for explaining the principle of gearshift of the transmission 200.

The transmission 200 is constituted as a four-stage transmission. That is, it is possible for the transmission 200 to choose a gear step from three forward gear steps which consist of the first gear step, the second gear step and the third gear step in descending order of the change gear ratio, and to choose one reverse gear step (reverse) reversing the rotation direction of the output shaft 12 to the input shaft 11. Below, the operation to select each gear step i.e., the operation to choose one internal gear among the internal gears 91 to 93 and 44 and to stop rotation in the condition that each internal gear 91 to 93 and 44 is independently rotating with rotation of the input shaft 11 is explained.

(1) Selection of the First Gear Step

When the actuator 67 is driven and rotation of the internal gear 93 is only stopped while the input shaft 11 rotates to the rotation direction Ri, orbital motion of the shaft 80 centering on the main shaft 1c is performed at the orbital speed specified by the engagement between the internal gear 93 and the planetary gear 83, and the engagement between the planetary gear 83 and the sun gear 73. By the orbital motion of this shaft 80, the carrier part 5 rotates with a focus on the main shaft 1c, and the output shaft 12 connected to the carrier part 5 also rotates with the change gear ratio of the first gear step to the same rotation direction Rf as the rotation direction Ri of the input shaft 11.

(2) Selection of the Second Gear Step

When the actuator 66 is driven and rotation of the internal gear 92 is only stopped while the input shaft 11 rotates to the rotation direction Ri, orbital motion of the shaft 80 centering on the main shaft 1c is performed at the orbital speed specified by the engagement between the internal gear 92 and the planetary gear 82, and the engagement between the planetary gear 82 and the sun gear 72. By the orbital motion of this shaft 80, the carrier part 5 rotates with a focus on the main shaft 1c, and the output shaft 12 connected to the carrier part 5 also rotates with the change gear ratio of the second gear step to the same rotation direction Rf as the rotation direction Ri of the input shaft 11.

(3) Selection of the Third Gear Step

When the actuator 65 is driven and rotation of the internal gear 91 is only stopped while the input shaft 11 rotates to the rotation direction Ri, orbital motion of the shaft 80 centering on the main shaft 1c is performed at the orbital speed specified by the engagement between the internal gear 91 and the planetary gear 81, and the engagement between the planetary gear 81 and the sun gear 71. By the orbital motion of this shaft 80, the carrier part 5 rotates with a focus on the main shaft 1c, and the output shaft 12 connected to the carrier part 5 also rotates with the change gear ratio of the third gear step to the same rotation direction Rf as the rotation direction Ri of the input shaft 11.

(4) Selection of the Reverse Gear Step

As for the selection of the reverse gear step, the same selection operation as the first preferred embodiment is performed. By this, the output shaft 12 rotates to the reverse direction Rv of the rotation direction Ri of the input shaft 11.

Although each gear step can be choose in the transmission 200 as mentioned above, the rotation region (the range of revolution speed) is restrict when the input shaft 11 is connected to an engine etc. of an automobile. Thus by only driving the actuators 65 to 68 and suddenly stopping rotation of each internal gear 91 to 93 and 44, there is a case where the engine is loaded to stop, and possibility that an intense gear change shock may arise.

So, when the transmission 200 is equipped in an automobile, the same gearshift operation (refer to FIG. 4) as the transmission 100 of the first preferred embodiment is performed.

By the above configuration and operation of the transmission 200, since the gearshift is carried out by making braking force act gradually to rotation of the internal gear of the selected gear step, a power interrupter becomes unnecessary and the miniaturization of the transmission can be attained. Moreover, since the transmission 200 is a gear-type transmission, the efficiency of power transfer is good.

Modification

In the gear selection part of each above-mentioned preferred embodiment, it is not indispensable to be equipped with the same number of the braking parts as the number of the internal gears. The gear selection part may be equipped with one movable braking part explained below.

Figure 8:
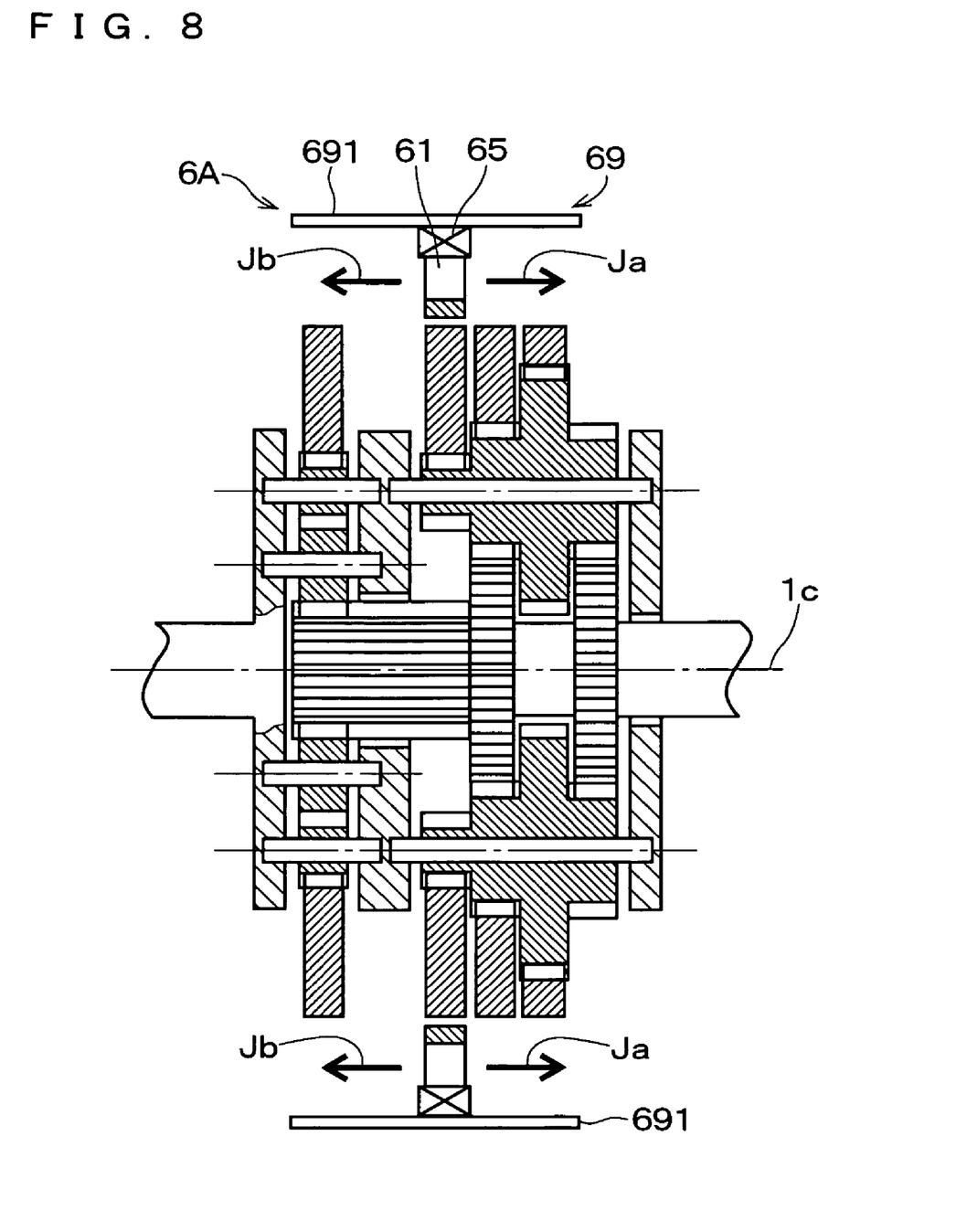
FIG. 8 is a sectional view showing the configuration of the gear selection part concerning the modification of this invention.

FIG. 8 is a sectional view showing the configuration of the gear selection part 6A concerning the modification of this invention.

The gear selection part 6A is equipped with the braking part 61 and the actuator 65 which have the same configuration as each above-mentioned preferred embodiment, and the driving mechanism 69 for relatively moving the actuator 65 with respect to the internal gear group in the directions Ja and Jb parallel to the main shaft 1c.

The driving mechanism 69 is equipped with the guide 691 which defines the migration pathway of the braking part 61 and the actuator 65. The migration of the braking part 61 (actuator 65) which follows this guide 691 is performed by for example, the hydraulic actuator (un-illustrating).

By such a driving mechanism 69, the braking part 61 can be moved on the peripheral face of each internal gear, and the braking force can be made to act selectively to each internal gear.

Figure 9:
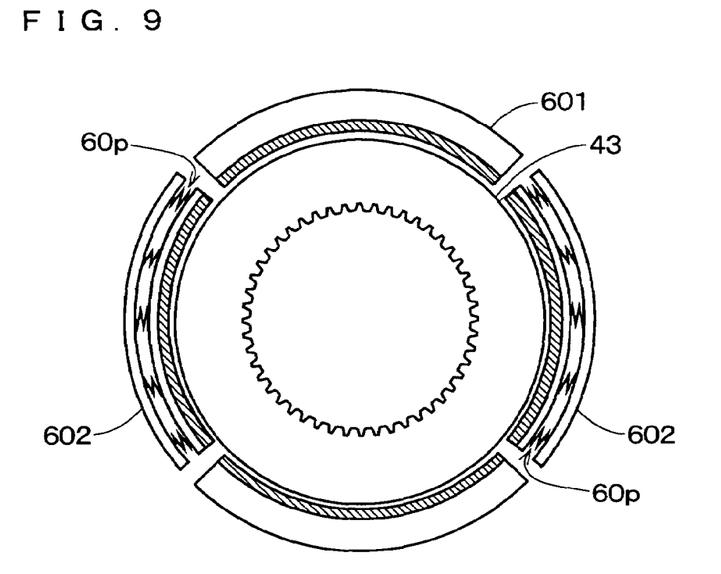
FIG. 9 and FIG. 10 are drawings for explaining two kinds of the braking parts concerning the modification.
Figure 10:
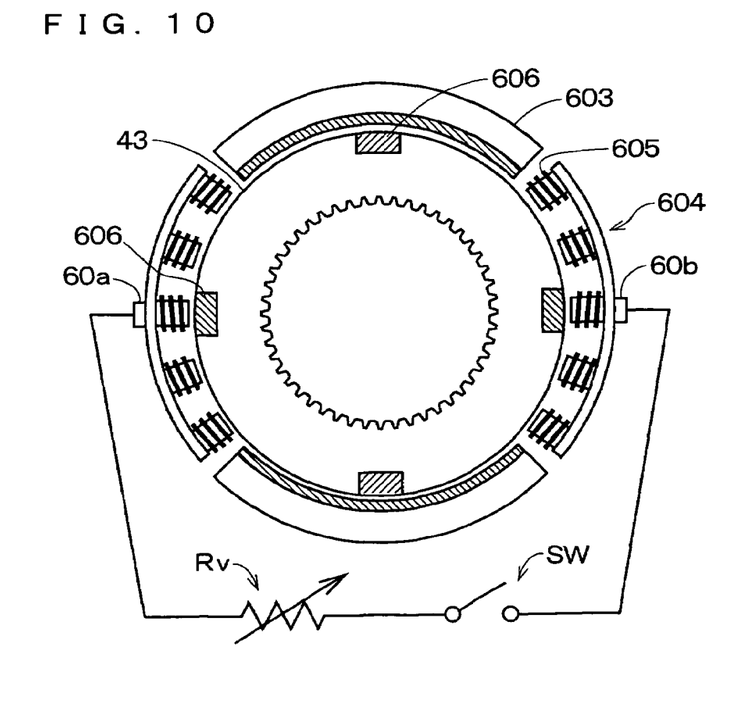

The transmission of each above-mentioned preferred embodiment may be equipped with two kinds of braking parts as shown in FIG. 9 and FIG. 10.

Two kinds of the braking parts shown in FIG. 9 comprise of the braking part 601 which has the same configuration as the braking part 61 of the first preferred embodiment, and the braking part 602 in which elastic body (for example, spring) 60p is inserted into the braking part 61, and are arranged around the internal gear 43 (FIG. 1) of the first preferred embodiment. Even if this braking part 602 is pushed against the internal gear 43 by the actuator, since the elastic deformation arises in elastic body 60p, the braking force enough to stop rotation of the internal gear 43 completely cannot be made to act. That is, in the braking part 602, the braking force can be changed within the range from the braking force "0" to the braking force with which rotation of the internal gear 43 is restricted by the mechanical technique using the elastic body. It is possible to switch only between the free state and the restriction state with regard to rotation of the internal gear 43. Consequently, the creep in the time zone Tc of FIG. 4 is carried out easily. In addition, the braking part 601 takes charge of stopping rotation of the internal gear 43 completely.

Two kinds of the braking parts shown in FIG. 10 comprise the braking part 603 which has the same configuration as the braking part 61 of the first preferred embodiment and the braking part 604 constituted as a stator of a synchronous motor, and are arranged around the internal gear 43 (FIG. 1) of the first preferred embodiment.

The braking part 604 has two or more winding parts 605. By rotating four permanent magnets 606 embedded in the periphery part of the internal gear 43 with the internal gear 43, the braking part 604 functions as a generator which generates power between terminals 60a and 60b.

Here, the terminal 60a and the terminal 60b are electrically connected through the variable resistance Rv and the switch SW, and an electrical circuit is formed. Then the braking force made to act on rotation of the internal gear 43 can be adjusted as well as so-called regenerative braking of an electric train by turning on the switch SW and fluctuating the resistance value of the variable resistance Rv. Moreover, if the switch SW is turned off, it is possible to make the braking force on the internal gear 43 into zero.

Thus, by changing over of the switch SW connected to the braking part 604, and changing the resistance value of the variable resistance Rv, the braking force which falls short of the rotation stoppage of the internal gear 243 can be controlled with a sufficient precision. That is, in the braking part 604, the braking force can be changed within the range from the braking force "0" to the braking force with which rotation of the internal gear 43 is restricted by the electromagnetic technique. It is possible to switch only between the free state and the restriction state with regard to rotation of the internal gear 43. Consequently, the creep in the time zone Tc of FIG. 4 is carried out easily. In addition, the braking part 603 takes charge of stopping rotation of the internal gear 43 completely.

In addition, the synchronous motor is connected to the internal gear through a gear, and the same operation as the above may be performed. The same effectiveness can be acquired also in this case.

About the planetary gear part in each above-mentioned preferred embodiment, it is not indispensable to have four pinions 3a (the pinion group 8a). The planetary gear part may have three pinions or, five or more pinions. However, when pressing the peripheral face of the internal gear with two shoes which are opposite like each above-mentioned preferred embodiment, it is desirable to make the number of pinions even in consideration of balance.

About the braking part in each above-mentioned preferred embodiment, it is not indispensable to have a configuration like a drum brake. The braking part may have a configuration like a disk brake or a multiple clutch etc.

About the gearshift mechanism part in each above-mentioned preferred embodiment, it is not indispensable to use a spur gear as shown in FIG. 1. A helical gear may be used.

About the transmission in each above-mentioned preferred embodiment, input/output shafts may be reversed to connect the output shaft to the sun gear and connect the input shaft to the carrier part.

About the transmission in each above-mentioned preferred embodiment, it is not indispensable to control gearshift timing and to make gearshift automatically. A driver etc. may make gearshift manually.

About the transmission in each above-mentioned preferred embodiment, it is not indispensable to have three planetary gears each of which has the different number of teeth. The transmission may have two planetary gears or, four or more planetary gears each of which has the different number of teeth.

While the invention has been shown and described in detail, the foregoing description is in all aspects illustrative and not restrictive. It is therefore understood that numerous modifications and variations can be devised without departing from the scope of the invention.

What is claimed is:

1. A transmission capable of performing a gearchange between an input shaft and an output shaft, comprising:
    (a) a sun gear operatively connected to said input shaft or said output shaft;
    (b) a planetary gear group including two or more multi-stage planetary gears equipped with a plurality of gears each of which has a different number of teeth, said plurality of gears including a specific gear which meshes with said sun gear, and being added to another gear which has the same number of teeth as said specific gear and meshes only with said sun gear;
    (c) a carrier rotatably holding each of said two or more multi-stage planetary gears;
    (d) an internal gear group including internal gears which mesh with each of said plurality of gears in each of said two or more multi-stage planetary gears; and
    (e) a braking selector which makes braking force act selectively on a rotating motion of each of said internal gears, said braking selector including a braking force changer which changes a free state, a restriction state and a stop state with regard to rotation of each of said internal gears by changing said braking force.

2. The transmission according to claim 1, wherein said braking force changer changes said braking force by changing a thrust of a member pressed on each of said internal gears.

3. A transmission capable of performing a gearchange between an input shaft and an output shaft, comprising:
    (a) a sun gear operatively connected to said input shaft or said output shaft;
    (b) a planetary gear group including two or more multi-stage planetary gears equipped with a plurality of gears each of which has a different number of teeth, said plurality of gears including a specific gear which meshes with said sun gear;
    (c) a carrier rotatably holding each of said two or more multi-stage planetary gears;
    (d) an internal gear group including internal gears which mesh with each of said plurality of gears in each of said two or more multi-stage planetary gears; and
    (e) a braking selector which makes braking force act selectively on a rotating motion of each of said internal gears, said braking selector including a braking force changer which changes a free state, a restriction state and a stop state with regard to rotation of each of said internal gears by changing said braking force, said braking force changer including a limitation changer capable of switching only between said free state and said restriction state.

4. A transmission capable of performing a gearchange between an input shaft and an output shaft, comprising:

(a) a multi-stage sun gear operatively connected to said input shaft or said output shaft and including a plurality of gears each of which has a different number of teeth;

(b) a planetary gear group which has plural sets of planetary gears which mesh with each of said plurality of gears in said multi-stage sun gear;

(c) a carrier rotatably holding each planetary gear in each of said plural sets of planetary gears;

(d) an internal gear group including internal gears which mesh with said each planetary gear; and (e) a braking selector which makes braking force act selectively on a rotating motion of each of said internal gears, said braking selector including a braking force changer which changes a free state, a restriction state and a stop state with regard to rotation of each of said internal gears by changing said braking force, said braking force changer including a limitation changer capable of switching only between said free state and said restriction state.

5. The transmission according to claim 4, wherein said braking force changer changes said braking force by changing a thrust of a member pressed on each of said internal gears.

* * * * *